United States Patent [19]

Leslar et al.

[11] 4,085,292

[45] Apr. 18, 1978

[54] COMBINATION ALARM AND AUTOMATIC TELEPHONE ANSWERING SYSTEM

[75] Inventors: David Louis Leslar; John Cyril Kirk, both of Mississauga, Canada

[73] Assignee: Alarmco Inc., Scarborough, Canada

[21] Appl. No.: 737,449

[22] Filed: Nov. 1, 1976

[51] Int. Cl.² .......................................... H04M 11/04
[52] U.S. Cl. .................................... 179/2 A; 179/5 R
[58] Field of Search .................. 179/2 R, 2 A, 2 AM, 179/5 R, 5 P; 340/408

[56] References Cited

U.S. PATENT DOCUMENTS

| 3,325,598 | 6/1967 | O'Neill | 179/2 A |
| 3,567,864 | 3/1971 | Palmer | 179/5 R |
| 3,787,624 | 1/1974 | Spitalny | 179/2 A |

Primary Examiner—Kathleen H. Claffy
Assistant Examiner—Joseph A. Popek
Attorney, Agent, or Firm—Rogers, Bereskin & Parr

[57] ABSTRACT

An improved combination alarm and automatic telephone answering system for connection to a telephone line, which is adapted to permit a person to determine the existence of one or more alarm conditions at a remote location by telephoning a predetermined telephone number at the remote location and listening for a coded signal indicative of normal or alarm conditions. In an optional mode, the incoming call is not answered, to thereby signify normal conditions.

4 Claims, 3 Drawing Figures

FIG. 3

| No. OF ALARMS | a | b | c |
|---|---|---|---|
| 1 | Reset logic not required | | |
| 2 | b | B | b |
| 3 | A | B | b |
| 4 | b | c | C |
| 5 | A | a | C |
| 6 | b | B | C |
| 7 | A | B | C |
| 8 | V⁻ | a | b |

CONNECTION TABLE

Where  a, b, c — input terminals of NAND gate 42 (see FIG. 2)

A, B, C — output terminals of counter 36 (see FIG. 2)

COMBINATION ALARM AND AUTOMATIC TELEPHONE ANSWERING SYSTEM

This invention relates to alarm systems and in particular to an improved combination alarm and automatic telephone answering system which enables a person to determine the existence of normal or alarm conditions at a remote location by telephoning a predetermined telephone number at the remote location.

Prior alarm systems for remotely indicating an alarm condition generally operate by sending an electrical signal via a private telephone line to a remote supervisory location. This either triggers an alarm or causes a remote private telephone to ring. When the telephone is answered, a coded tone indicates an alarm condition.

A disadvantage of these systems is the need for maintaining constant supervision of the alarm system. Such systems therefore are relatively expensive to operate. In addition, such systems are generally intended to respond to alarm conditions requiring immediate attention such as fire or breaking and entering. Other alarm conditions such as abnormal temperature in a commercial refrigerator or freezer (for e.g. in a supermarket) or in a summer cottage (e.g. to guard against frozen water pipes) do not require such immediate attention, although it would be desirable to be able to monitor such conditions remotely, from time to time, without the expense and complexity of conventional alarm systems of the kind referred to above.

In the present invention, these disadvantages are overcome by combining an improved alarm system with an automatic telephone system so that the existence of an alarm condition at a remote location can be determined from time to time by telephoning a predetermined telephone number at the remote location. Coded signals indicative of an alarm condition are generated and fed into the telephone system, upon receipt of an incoming call. In a preferred embodiment of the invention, which is adapted to be connected to a conventional voice station coupler, an incoming call actuates a line grabbing circuit and a master timer which is adapted to time the duration a cycle of operation of the apparatus. The line grabbing circuit enables a sequence interrogator which selects one or more alarm sensors in succession and analyzes the status of each alarm sensor. If an alarm condition is detected, a long single tone is fed into the telephone system. If no alarm condition is detected, a short single tone is fed into the telephone system. When all the alarm sensors have been checked, another sequence of interrogation of the alarm sensors begins after a short pause. This process is repeated for the duration set by the master timer and then the apparatus shuts off automatically. It is possible to connect the apparatus so that an incoming call is not answered when no alarm condition exists.

Accordingly, it is an object of the invention to provide an improved combination alarm system and automatic telephone answering system which is capable of being interrogated remotely from time to time from any location where there is a telephone, by telephoning the number of a telephone situated in the premises monitored by the alarm system, and listening for coded signals, or the absence of any response, as the case may be.

In the drawings,

FIG. 3 shows a connection table for use in adapting the circuit of FIG. 1 to accommodate a predetermined number of alarm sensors at a given location.

GENERAL DESCRIPTION

Figure 1:
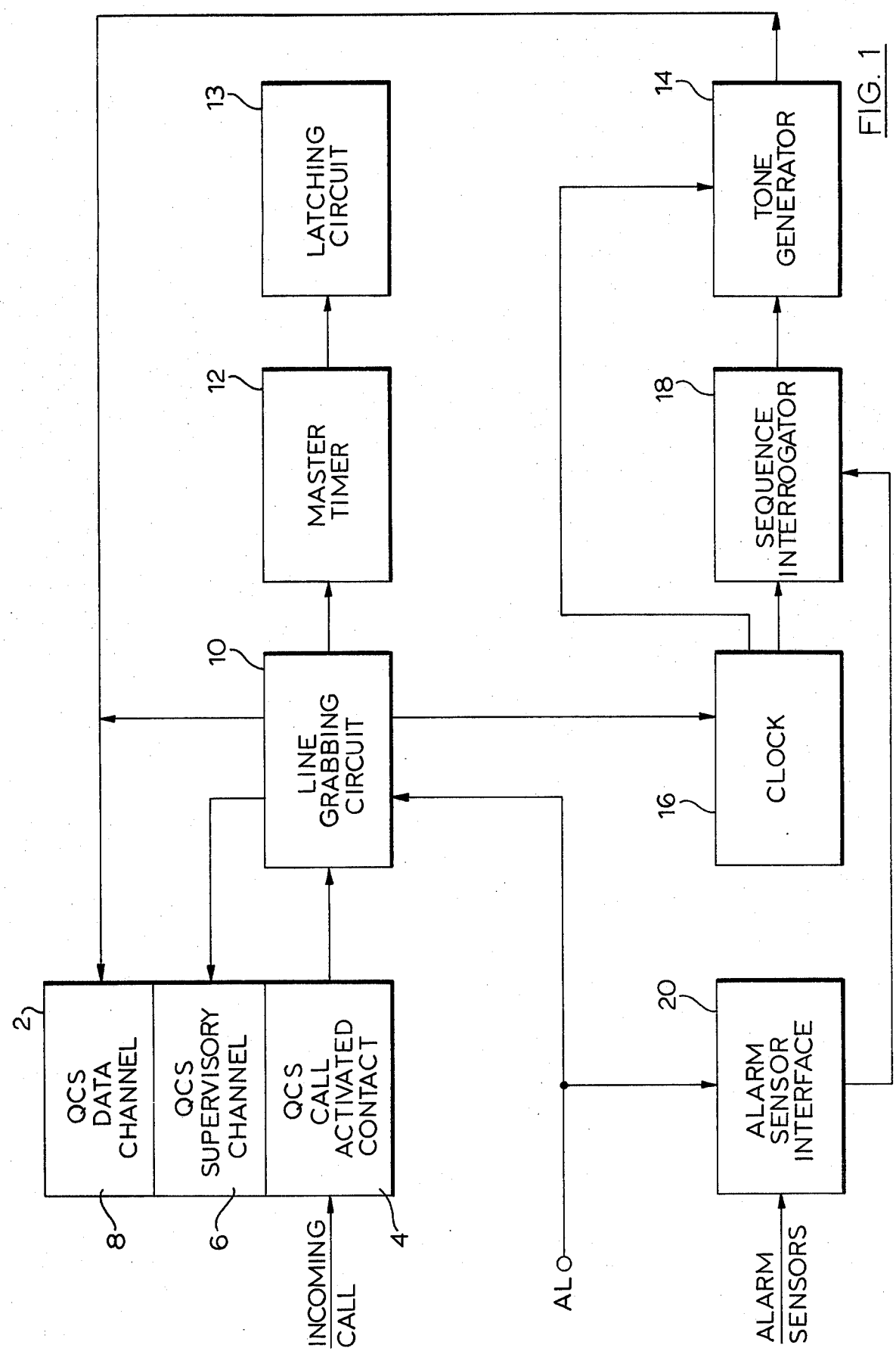
FIG. 1 is a block diagram of a circuit of a preferred embodiment of the invention.

Reference is first made to FIG. 1. The apparatus according to the invention preferably is designed to operate with a conventional voice station coupler 2 (hereinafter referred to as QCS) which generally is supplied and installed by the telephone company. The QCS 2 is external to the present apparatus, but is electrically connected to the apparatus as will be described.

The QCS includes, call activated contact 4, supervisory channel 6 and data channel 8. When there is an alarm condition or terminal AL optionally is connected to ground, an incoming telephone call received by QCS (which is connected to the telephone line) causes contact 4 of QCS to close completing the power circuit of a line grabbing circuit 10. A master timer 12 is also started. The output of the master timer 12 drives a latching circuit 13 so that power is supplied to the rest of the apparatus after the call has been received.

The line grabbing circuit 10 causes a short to be placed across the supervisory channel 6 of QCS 2 capturing the line after at least one ring. After a predetermined delay, the output of a tone generator 14 is connected to the data channel 8 of QCS 2. The apparatus is now in condition for transmitting coded signals into the telephone system. At the same time, a clock 16 is activated and narrow negative going pulses are produced at its output. These pulses operate a sequence interrogator 18 which automatically selects in succession alarm inputs from an alarm sensor interface 20 and interrogates them. In the embodiment described, eight alarm inputs are provided; more could be added by modifying the circuitry. The output of the sequence interrogator 18 drives the tone generator 14. If an alarm condition is detected, a 1.2 second 1 KHz tone is fed into the telephone system. If no alarm condition is detected, a short (200 ms) 1 KHz tone is fed into the telephone system. When all the alarm inputs have been interrogated, after a predetermined pause a new sequence of interrogations begins. This carries on for the duration set by the master timer 12 and then the apparatus shuts off automatically. Conventional alarm sensors can be used to indicate any predetermined alarm condition, such as a thermostatic switch to detect temperature, or any other device which, like a switch, may be electrically connected to the alarm system to indicate either normal or alarm conditions.

DETAILED DESCRIPTION

Figure 2:
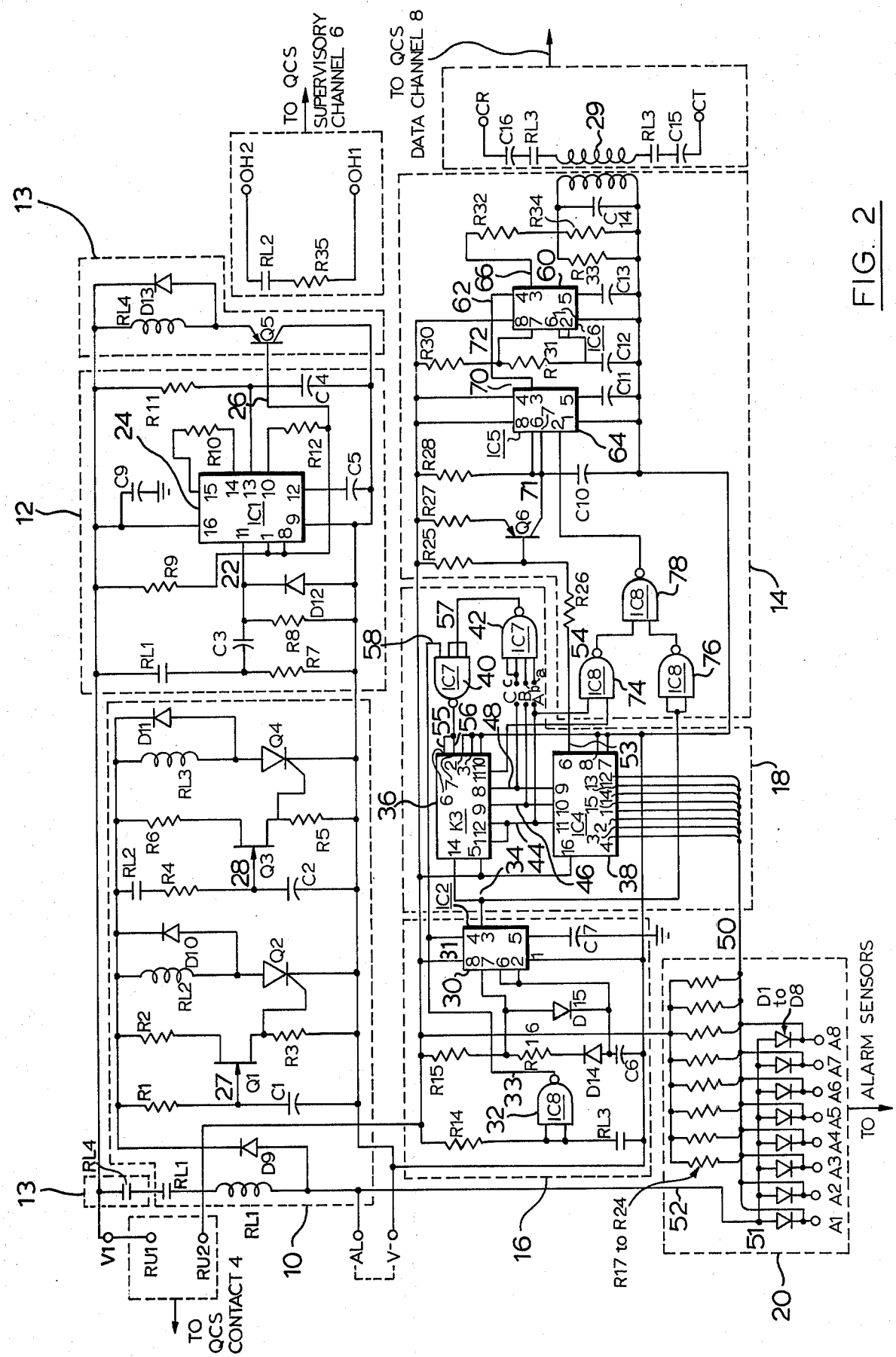
FIG. 2 is a schematic diagram of the circuit of FIG. 1.

As shown in FIG. 2, when the call activated contact 4 of QCS 2 is closed, a short circuit occurs across terminals RU1, RU2 (top left hand corner of FIG. 2). The coil of relay RL1 is energized causing the contacts of relay RL1 in both the line grabbing circuitry 10 and the master timer 12 to close. Power is applied to a differentiating network comprising resistor R8, capacitor C3 and diode D12. A positive pulse is directed along conductor 22 into a programmable timer/counter 24 consisting of an internal time base oscillator, an eight bit programmable counter and a control flip-flop. An appropriate device is a programmable timer EXAR 2240 CP of Exar Integrated Systems. The positive pulse triggers the internal oscillator and starts the timing period. The timing period is set by an external RC network comprising R11 and C4. The timing period is a matter of choice; a reasonable interval is approximately two minutes. Resistors R9 and R10 serve as pull up resistors, for TTL applications and resistor R12 provides a return path for a pulse to reset the master timer 12.

When the master timer 12 is on, the output signal level along conductor 26 is low. This low signal level turns transistor Q5 of a latching circuit 13 on and the coil of relay RL4 is energized. The contacts of relay RL4 close, (see top left hand corner of FIG. 2) and allows the contacts of relay RL1 to latch and supply power to the rest of the device after the call has been answered. When the master timer 12 finishes its count and resets, the output signal level along conductor 26 becomes high. This high signal level switches off transistor Q5 and no energy is passed into the coil of relay RL4. The contacts of RL4 drops and power is cut, ending a cycle of operation.

The short across the terminals RU1 and RU2 also applies power to a time delay circuit comprising resistor R1 and capacitor C1 in the line grabbing circuit 10. When the voltage across capacitor C1 at the point 27 has built up sufficiently, a SCR trigger circuit comprising resistors R2, R3 and transistor Q1 is activated. The output of this trigger circuit taken across resistor R3 fires a SCR Q2 and energizes the coil of a relay RL2. The contacts of relay RL2 close and a short circuit occurs across the terminals OH2 and OH1 of the supervisory channel 6 of QCS 2, thus capturing the line. The delay prior to the closing of the relay contacts ensures at least one ring is received before the line is captured.

When the coil of relay RL2 is energized, power is also applied to a second delay circuit comprising resistor R4 and capacitor C2. When the voltage across capacitor C2 at point 28 has built up sufficiently, a SCR trigger circuit comprising resistors R6, R5 and transistor Q3 is activated. The output of this trigger circuit taken across resistor R5 fires SCR Q4 and energizes the coil of a relay RL3. The contacts of relay RL3 close and a short is placed across the terminals CR and CT of the data channel 8 of QCS 2 via capacitors C15, C16 and the secondary of a isolating audio transformer 29. Capacitors C15, C16 decouple the power supply of QCS from the tone generator 14 yet provide a low resistance path for tone signals.

The energized relay RL3 also enables a clock 16. The delay supplied by resistor R4 and capacitor C2 preferably is approximately fifteen seconds. This allows sufficient time for stabilization of both the clock 16 and the tone generator 14 circuits.

The clock is a NE 555 type timer 30 made by National Semiconductor Corporation wired to operate as an astable multivibrator. When the contacts of relay RL3 close, power is applied to the clock circuit 16. Capacitor C6 charges through resistor R15 and diode D15, and discharges through resistor R16 and diode D14. This circuit provides the necessary time constant and orientation for the output signal of clock 16. The inhibit terminal 31 of timer 30 is held low by the output of a NAND gate 32. When the contacts of relay RL3 close, the connected inputs of NAND gate 32 is low producing a high output signal along conductor 33 which is connected to the inhibit terminal 31. This high output signal enables timer 30 to function as an astable multivibrator and produce a short (200 ms in the preferred embodiment) negative going pulse at the output conductor 34 of clock 16 every 1.5 seconds.

This train of negative going pulses is directed along conductor 34 into the sequence interrogator 18. The sequence interrogator includes a binary counter 36, a multiplexer 38 and reset logic comprising NAND gates 40, 42 and connection terminals A, B, C, a, b, c. Output pulses from the clock 16 are counted by the counter 36 which produces a binary code for each count. An appropriate binary counter is a 16 bits BCD counter SN 7490 made by Texas Instrument Corporation. The binary code is directed along conductors 44, 46, 48 into multiplexer 38. An input corresponding to the binary code is selected for further processing. The multiplexer inputs are connected to an alarm sensor interface 20 by trunk conductor 50.

Alarm sensor interface 20 comprises diodes D1, D2, D3, D4, D5, D6, D7, D8 and resistors R17, R18, R19, R20, R21, R22, R23, R24. The diodes serve to isolate the alarm sensors and the resistors are pull up resistors for TTL applications. The positive terminals of the diodes are jointed together at point 51 which is in turn connected to one end of the relay coil of RL1 by conductor 52. When there is an alarm condition, at least one of the terminals A1, A2, A3, A4, A5, A6, A7, A8 is a closed circuit, so that when terminals RU1 and RU2 of line grabbing circuit 10 are shorted by an incoming call, the coil of relay RL1 is energized.

An appropriate multiplexer is an 8 to 1 multiplexer SN 74151 made by Texas Instrument Corporation which can accommodate up to eight inputs. When a particular alarm sensor is selected, if it is in an alarm state, the output signal level at terminal 53 goes high. If there is no alarm condition, the output signal level is low. This output signal is directed along conductor 54 to drive the tone generator 14.

The combined action of BCD counter 36 and multiplexer 38 allows the alarm sensors terminals A1, A2, A3, A4, A5, A6, A7 to be checked one by one in succession. In this embodiment a maximum of eight alarm sensors may be used. However, more alarm sensors may be used by replacing the BCD counter with a binary counter and the multiplexer with a 'one of sixteen' multiplexer.

NAND gates 40, 42 provide the logic for resetting BCD counter 36 if fewer than eight alarm sensors are employed. BCD counter 36 has two reset terminals 55, 56. If a high signal level is applied at these terminals, the counter will be reset to its zero binary state. The inputs to NAND gate 42 are connected to the outputs of BCD counter 36 via conductors 44, 46, 48 in such a way that before a reset is desired, the output of NAND gate 42 is always high. Terminals A, B, C connected to the outputs of BCD counter 36 and terminals a, b, c, connected to the inputs of NAND gate 42 are provided for selecting a desired reset count. FIG. 3 shows a connection table for resetting the BCD counter 36 after any count from 2 to 8. The output from NAND gate 42 is fed into NAND gate 40 through conductor 57. The other input 58 to NAND gate 40 is a signal originated from NAND gate 32 in the clock circuit 16. This signal is always high so that the output of NAND gate 40 is always low before reset is desired. When reset occurs, the output level along conductor 57 is low. Since the signal level at input 58 of NAND gate 40 is always high, the output becomes high and BCD counter 36 resets. When BCD counter 36 resets, a new sequence of count is initiated and the alarm sensors are re-checked in succession.

The output of the sequence interrogator 18 is directed along conductor 54 into the tone generator 14 and drives it. The tone generator comprises an oscillator 60, which is a NE555 type timer made by National Semiconductor Corporation wired to operate as an astable multivibrator. Resistors R30, R31 and capacitor C12 set the frequency of the tone produced. In the preferred embodiment a 1 KHz tone is chosen. The inhibit terminal 62 is kept low by the output of a monostable multivibrator 64.

Monostable multivibrator 64 is a NE555 type timer made by National Semiconductor Corporation wired to operate as an monostable multivibrator. The output at terminal 70 is a single pulse width of which is set by resistors R27, R28, transistor Q6 and capacitor C10. When no alarm condition is detected, the output at terminal 53 of the sequence interrogator 18 is low. Transistor Q6 is on due to biasing by resistors R25 and R26. Resistor R27 is in parallel with resistor R28. The pulse width at terminal 70 is determined by resistors R27, R28 and capacitor C10, is approximately equal to 200 milliseconds (ms.) in the preferred embodiment. When an alarm condition is detected, the output of sequence interrogator 18 becomes high. This changes the biasing of transistor Q6 and turns it off. Resistor R27 is not connected to the point 71 and the pulse width at terminal 70 is determined by resistor R28 and capacitor C10 only. A long pulse is produced and in the preferred embodiment the width is approximately 1.2 second.

These output pulses from monostable multivibrator 64 are directed along conductor 72 to the inhibit terminal 62 of the tone generator 64. Each pulse removes the inhibit signal and allows a 1 KHz tone to be generated for a duration equal to its pulse width. Thus, when an alarm condition is detected, a 1.2 second 1 KHz tone is directed into the telephone system. When there is no alarm condition, a short 200 ms. 1 KHz tone is heard over the telephone.

NAND gates 74, 76, 78 provide the logic to condition the pulses from clock 16 in order to trigger monostable multivibrator 64. When BCD counter 36 resets, the logic also provides a blank pulse to separate each sequence of alarm sensor checks.

The output from tone generator is directed into a matching network comprising the resistors R32, R33, R34, capacitor C14 and audio transformer 29. Audio transformer 29 isolates the telephone system from the answering device. Resistors R33, R34, capacitor C14 and the primary of audio transformer 29 are connected in parallel. They are in turn connected in series with resistor R32. Resistor R32 is connected to the output terminal 66 of tone generator 60. This combination provides the proper signal level and impedance matching with the telephone system. The matched output from message generator 14 is then directed into the data channel 8 of QCS 2.

In operation, when a call is received, the line is captured and the master timer is actuated. Then, alarm sensors are interrogated sequentially. If an alarm is detected, a 1.2 second 1 KHz tone is heard over the phone. If there is no alarm condition, a short 1 KHz tone is heard over the phone. When all alarm sensors have been interrogated, a new sequence of interrogations begins after a pause. This carries on for the period set by the master timer and after such period automatically shuts off.

The embodiment just described uses a short or long tone of the same frequency to identify a no alarm or alarm state of an alarm sensor. If desired, different tones can be used to identify different alarm sensors. The BCD code from a BCD counter may be used to identify a particular alarm sensor with its special tone. If desired, instead of generating tones, tape messages may be used.

The QCS 2 may be connected to a regular telephone line. However, when the telephone line is being used for voice communication, the apparatus must be shut off or else it will answer all incoming calls on the first ring. (assuming AL is connected to $V^-$ or there is an alarm condition.)

If it is desired that the apparatus should answer an incoming call regardless whether any alarm condition exists, a link should be placed from AL to $V^-$ (ground) (see FIG. 2). If, however, it is desired that the apparatus should answer only when there is an alarm condition, no connection should be made between these points.

It will be understood that the term "alarm condition" is used herein in a general sense, and includes any condition which lies outside of predetermined limits of any predetermined parameter such as temperature, pressure, conductivity, etc.

We claim:

1. A combination alarm and automatic telephone answering apparatus adapted for monitoring at least one potential alarm condition at a remote location and adapted for connection to a telephone line, comprising:
   (a) at least one alarm sensor connected to said apparatus for sensing the existence of a predetermined alarm condition;
   (b) controllable means responsive to an incoming call on said telephone line for engaging said line;
   (c) control means coupled to said line engaging means for selectively interconnecting said line engaging means with said line so that when said control means is in a first condition said line is engaged in response to an incoming call on said telephone line, and when said control means is in a second condition said line is engaged in response to an incoming call on said telephone line only when said alarm sensor is in an alarm condition;
   (d) means coupled to said line engaging means and adapted to maintain said line engaging means in engagement with said line for a predetermined interval when said control means is in said first condition;
   (e) means connected to said alarm sensor for checking the condition thereof; and
   (f) means connected to said alarm sensor checking means for generating an alarm signal during said predetermined interval, which signal is indicative of the condition of such alarm sensor, said generating means being connected to said telephone line during said predetermined interval whereby said alarm signal is fed along said telephone line to the place where said call was initiated, to thereby provide an indication at said place of the existence of said alarm condition.

2. Apparatus as claimed in claim 1 wherein said means for maintaining said line engaging means in engagement with said line for a predetermined interval comprises a timer circuit.

3. Apparatus as claimed in claim 1 wherein said alarm sensor checking means comprises a clock pulse generator and alarm sensor interrogator means connected to said clock pulse generator, said alarm sensor interrogator means being operated by clock pulses generated by said clock pulse generator.

4. Apparatus as claimed in claim 1 wherein there is a plurality of alarm sensors, and wherein means is provided for sequentially interrogating each of said alarm sensors to determine the respective conditions thereof during said predetermined interval when said line is engaged, said interrogating means repeating the interrogation of each of said alarm sensors cyclically during said predetermined interval when said line is engaged.

* * * * *